United States Patent [19]
Binding et al.

[11] 3,899,111
[45] Aug. 12, 1975

[54] CAR TOP CARRIER FOR GUTTERLESS CAR TOPS
[75] Inventors: Kenneth W. Binding, Woburn; George A. Laberis, Wakefield, both of Mass.
[73] Assignee: Beatrice Foods Co., Chicago, Ill.
[22] Filed: Sept. 10, 1973
[21] Appl. No.: 395,949

[52] U.S. Cl............................................ 224/42.1 F
[51] Int. Cl............................................. B60m 9/04
[58] Field of Search...... 224/42.1 F, 42.1 E, 42.1 R, 224/29 R, 42.1 G; 248/361

[56] References Cited
UNITED STATES PATENTS

| | | | |
|---|---|---|---|
| 2,434,387 | 1/1948 | Brandt | 224/42.1 F |
| 2,436,228 | 2/1948 | Purchase | 224/42.1 F |
| 2,983,414 | 5/1961 | Fehr | 224/42.1 F |
| 3,239,175 | 3/1966 | Seibel | 248/361 X |
| 3,295,732 | 1/1967 | Haven | 224/42.1 F |
| 3,677,451 | 7/1972 | Burland | 224/42.1 F |

FOREIGN PATENTS OR APPLICATIONS

| | | | |
|---|---|---|---|
| 1,930,572 | 12/1970 | Germany | 224/42.1 G |

Primary Examiner—Robert J. Spar
Assistant Examiner—Jerold M. Forsberg
Attorney, Agent, or Firm—Robert T. Gammons; Dike, Bronstein, Roberts, Cushman & Pfund

[57] ABSTRACT

A car top carrier comprising an elongate rigid tubular bar, supporting legs and clamping linkages mounted to the underside of the bar at the ends for adjustment lengthwise thereof, to accommodate the width of the car top, said linkages embodying extendable hooks for clamping engagement with the ledges at the opposite sides of the top, at least one of the linkages including spring means compressed by retraction of the hooks into clamping engagement with the ledges, and clamp collars adjustably mounted on the bar for receiving the ends of flexible binding straps.

12 Claims, 6 Drawing Figures

PATENTED AUG 12 1975 3,899,111

SHEET 1

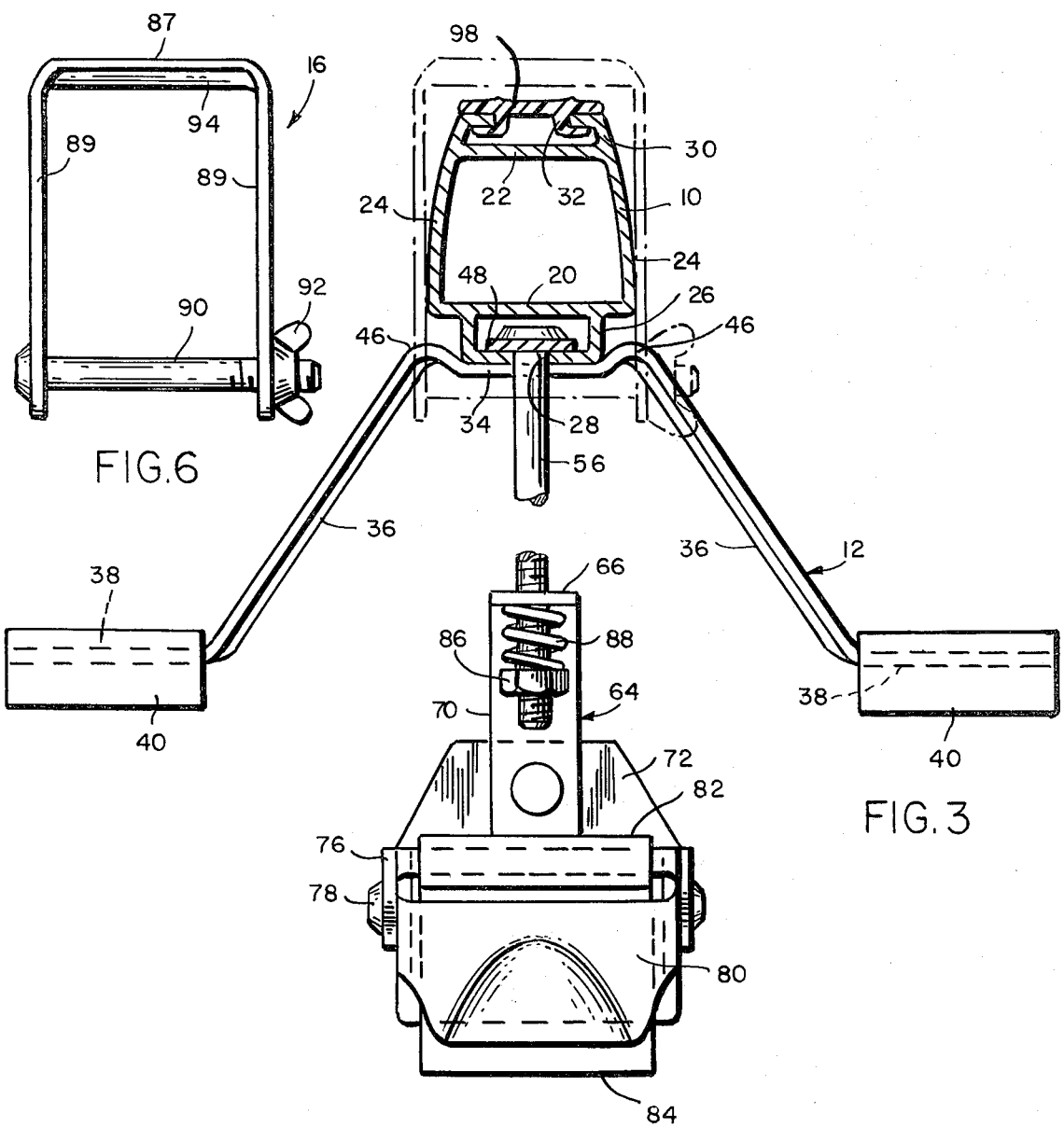
FIG.6
FIG.3
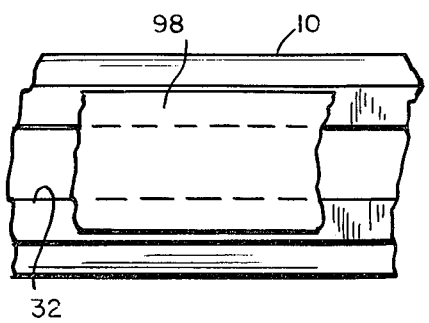
FIG.4
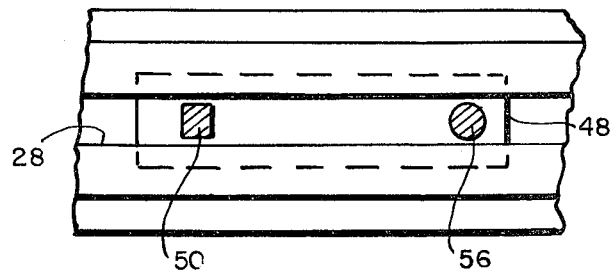
FIG 5

CAR TOP CARRIER FOR GUTTERLESS CAR TOPS

BACKGROUND OF THE INVENTION

There are many kinds of car top carrier bars designed to be mounted on the car top and clamped thereto by clamping means designed to be clamped to the gutters extending along the opposite sides of the car top. Currently many cars are being manufactured without gutters along the opposite sides of the top so that such car top carriers as have been previously designed cannot be satisfactorily used with these cars. It is accordingly the purpose of this invention to design a car top carrier which can be securely clamped to the top of a gutterless car top and which embodies, within its clamping, linkage means for taking up slack produced in the linkage. Other purposes are to provide a carrier designed to distribute the load over a relatively wide area to minimize overturn; to provide a carrier of maximum rigidity and strength and yet light weight; and to provide a carrier which is attractive.

SUMMARY

As herein illustrated, the car top carrier comprises an elongate rigid bar, retractable hooks, linkages connecting the hooks to the ends of the bar for adjustment when extended to a width corresponding to the width of the top of the car, said linkages embodying distended spring means in the extended positions of the hooks, and means for retracting the hooks when engaged with the ledges at the top into clamping engagement therewith and simultaneously to completely compress said spring means. Each linkage comprises a rod connected at one end to the underside of the bar, an angle bracket mounting the hook on the distal end of the rod, and a nut threaded onto the rod for limiting the movement of the hook toward the distal end thereof. The spring means comprises a coil compression spring mounted on one of the rods between the angle bracket and the nut. There are supports mounted on the underside of the bar, one at each end, inwardly of the linkages having legs extending forwardly and rearwardly of the longitudinal center line of the bar, to the lower extremities of which there are mounted resilient pads for engagement with the car top. A clamp part slidably mounted to the underside of the bar at each end supports the linkage and supporting leg at that end at a predetermined spacing for movement in unison lengthwise of the bar and there are means for fixing the clamp parts at predetermined positions on the bar. Clamp collars are mounted at the ends of the bar for receiving, at the upper side of the bar, the ends of flexible binding straps.

The invention will now be described in greater detail with reference to the accompanying drawings wherein:

FIG. 3 is an end elevation as seen from the right side of FIG. 2 with parts in section;

FIG. 4 is a fragmentary plan view of the upper side of the carrier bar;

FIG. 5 is a fragmentary plan view of the lower side of the carrier bar; and

FIG. 6 is an elevation of one of the clamp collars.

Figure 1:
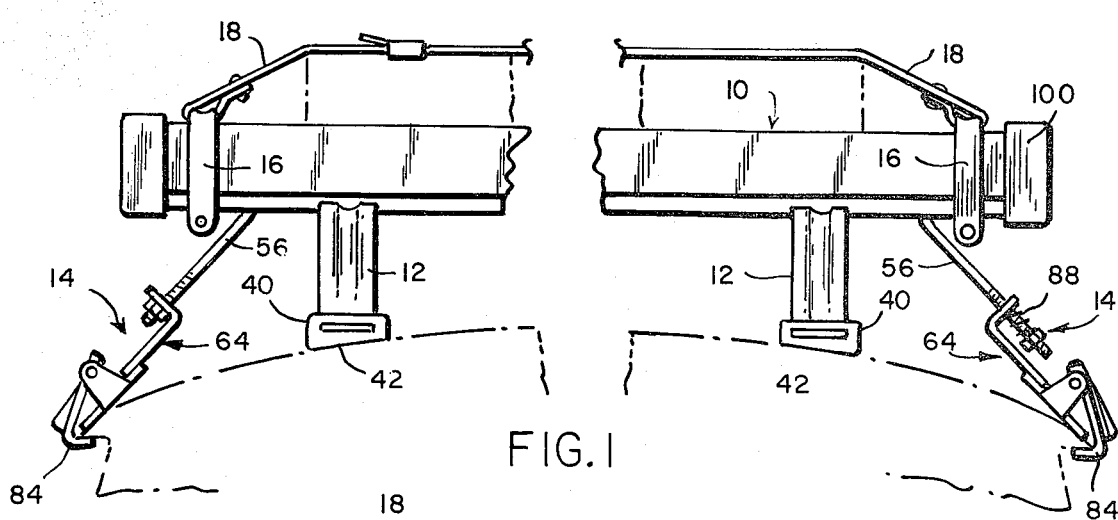
FIG. 1 is an elevation, broken away in part, taken transversely of a car top showing the car top carrier bar of this invention clamped to the car top.

Referring to the drawings the carrier comprises a rigid carrier bar 10, supporting legs 12—12, clamping linkages 14—14 and clamping collars 16—16 for receiving the ends of binding straps 18—18. The carrier is especially designed for application to a gutterless car top wherein the top terminates at its opposite side in downwardly facing ledges.

The carrier bar 10 is a hollow extruded structure generally trapezoidal in cross-section (FIG. 3) having a base side 20, a top side 22, spaced parallel sides 24—24, an integrally formed portion 26 at its bottom side of reduced, substantially rectangular cross-section containing a bottom opening 28 and an integrally formed portion 30 at the top side having a top opening 32. The structure is comprised of extruded aluminum and may be reinforced by corrugating the side walls 24—24.

Figure 2:
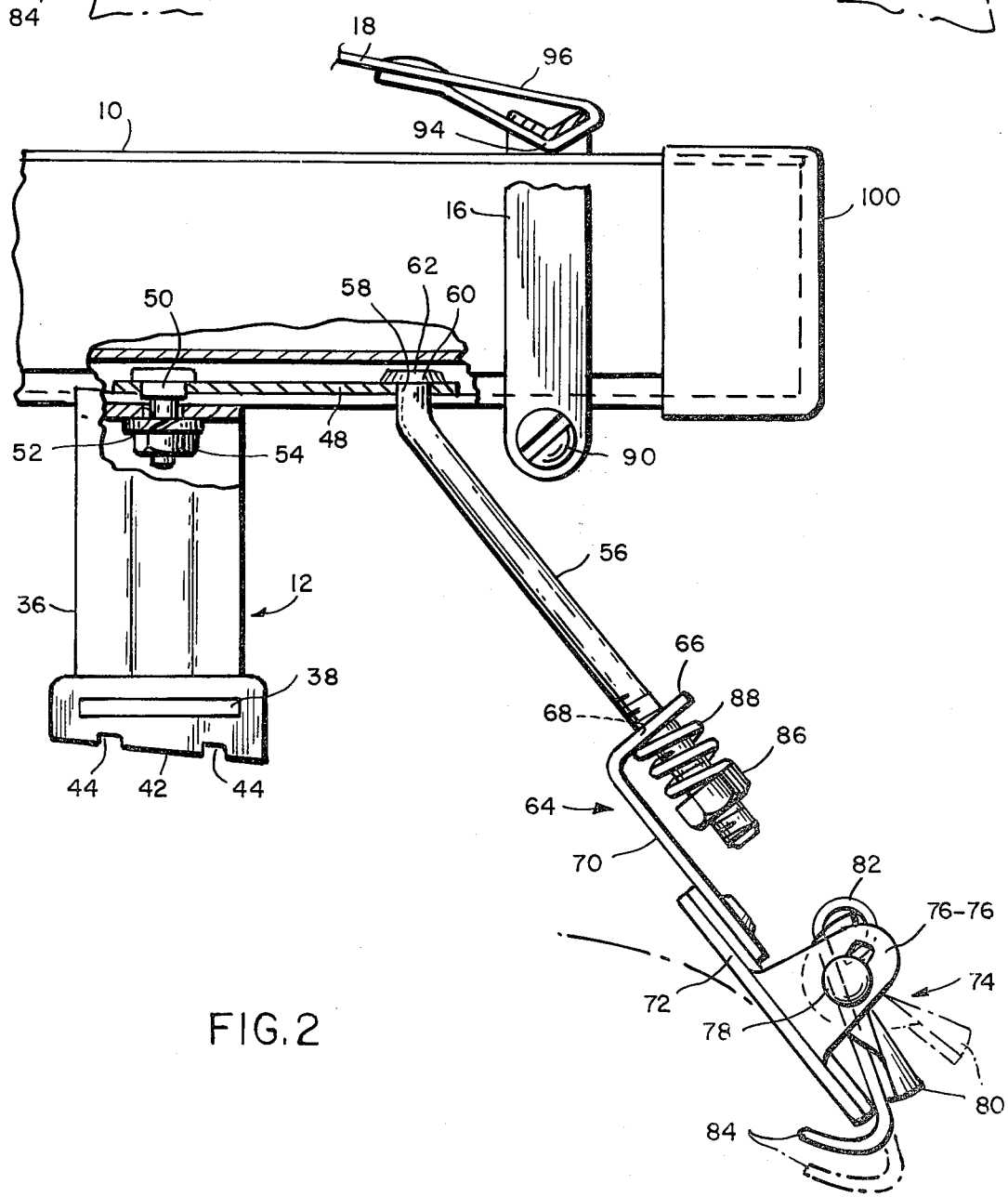
FIG. 2 is an enlarged elevation of the right side of FIG. 1 with parts in section.

The supporting legs 12, one of which is mounted at the underside of the bar at each end, each comprises (FIG. 3) a truncated A-shaped frame having a horizontal top part 34, at the ends of which are divergent legs 36—36, the lower extremities of which have horizontally disposed feet 38—38 on which are mounted pads 40—40. The pads 40—40 are comprised of rubber or other resilient friction engendering material and, as shown in FIG. 2, their lower surfaces 42—42 slope from their inner sides toward their outer sides and contain grooves 44. Upstanding ribs 46—46 are provided at the junctions of the legs with the top part 34, the distance between which corresponds substantially to the width of the part 26 at the lower side of the bar so that the latter seats on the top between the ribs. The legs are mounted to the underside of the bar by means of flat plates 48—48 (FIG. 2) slidingly disposed in the part 26 at the underside of the bar by means of bolts 50—50 mounted in the plates 48—48 which extend through the opening 28 and through holes 52—52 in the top parts 34—34 of the legs. The bolts have non-circular necks 50a and the holes 52 are non-circular. Nuts 54 threaded onto the bolts 50 against the underside of the top part 34 provide for fixing the clamp plate and hence the legs and linkages at a predetermined position. The plates 48—48 when released by loosening the nuts 54—54 can be moved longitudinally of the bar to accommodate the structure to the width of the roof to which it is mounted and may then be clamped in the selected position by tightening the nuts 54—54.

The linkages 14—14 (FIG. 2) each comprise a rod 56, one end 58 of which extends upwardly through an opening 60 in the plate 48 and has on it a head 62 and the other end of which extends downwardly and angularly outwardly therefrom and has mounted on it an angle bracket 64, one leg 66 of which is apertured at 68 to slidingly receive the rod 56 and the other leg 70 of which is riveted to a flat plate 72 on which is mounted a retractable hook 74. As illustrated, the plate 72 has transversely spaced, upstanding ears 76—76 on which there is pivotally mounted on a pin 78 a toggle lever 80 which is pivotally connected at 82 to a hook 84. By swinging the toggle lever 80 in a counterclockwise direction, as shown in FIG. 2, the hook may be distended to the dotted line position. The distance to which the hook may be moved outwardly along the rod is limited by a nut 86 threaded on the rod. At least one linkage also embodies spring means in the form of a coiled spring 88 (FIG. 2) mounted on the rod between the bracket member 64 and the nut 86. Prior to clamping the spring 88 is fully distended and when the carrier is mounted on the car top the nuts on the two rods are adjusted so that the hooks can be engaged with the ledges at the opposite side of the top without compression of the spring 88. The bar is now clamped in position by operating the toggles to move the hooks into clamping engagement and this clamping engagement simultaneously fully compresses the spring 88. The purpose of this is to provide for any slack which may be produced in the linkage by outside pressures such as acceleration or deceleration forces, wind pressure, and the like which would flex or cause the top to yield and hence lessen the clamping action of the hooks to an extent to permit the carrier bar to slide forwardly or rearwardly or even to become disengaged. One such coil spring is all that is required, although it is to be understood that two such springs could be used, one on each side if desired.

Since the linkages are connected to the plates 48—48 they are adjustable with the legs and are fixed by tightening the nuts 54—54.

The clamping collars 16—16 are mounted on the bar at each end outwardly of the linkages, as shown in FIGS. 1 and 2. Each collar (FIG. 6) comprises a U-shaped member having a back 87 corresponding substantially in width to the top of the bar 10, spaced parallel legs 89—89 which extend downwardly therefrom beyond the lower side of the bar and a connecting bolt 90 on which there is a wing nut 92 by means of which the legs are clamped to the sides of the bar. The back 87 is of V-shaped cross-section providing a rib 94 and a bail for receiving a loop 96 at one end of the binding strap 18. When the binding straps, connected to the collars, are drawn taut the collars are rocked toward each other and then become wedged by jamming the ribs 94—94 against the loops and the bar. The collars may be shifted to one side or the other of the center of the bar should it be desirable to place the article to be carried at one side or the other.

A capping strip 98 (FIG. 3) is slidingly engaged in the opening 32 at the top of the bar to provide a somewhat resilient friction engendering surface at the top and caps 100-100 are applied to the ends of the bar to provide for attractiveness.

The carrier is installed by adjusting the legs toward the ends of the bar so that the extended hooks at the ends of the linkages reach the ledges at opposite sides of the top whereupon the legs and linkages are fixed by tightening the nuts 54. The hooks are now adjusted along the rods by the nuts 86 to bring them snugly into engagement with the ledges, - the nut on the rod including the spring 88 being adjusted so that when the toggles are set in their clamping positions the spring 88 will be fully compressed. The structure may, of course, be attached to a car top provided with gutters by engaging the hooks with the undersides of the gutters at each side.

The structure as thus described is very simple to manufacture, is extremely rigid and durable, provides for maximum adjustment and is particularly adapted for gutterless vehicles, although it can be used on vehicles provided with gutters, provides for uniform weight distribution and requires no assembly on the part of the ultimate user.

It should be understood that the present disclosure is for the purpose of illustration only and that this invention includes all modifications and equivalents falling within the scope of the appended claims.

We claim:

1. A car top carrier for a gutterless car top having ledges at opposite sides thereof, comprising an elongate rigid bar, supports connected to the opposite ends of said rigid bar, retractable hooks and means at the ends of the bar connecting the hooks thereto for adjustment longitudinally of the bar to accommodate to the width of the top, each of said means comprising a rod connected at one end to the bar, a part mounting the retractable hook on the rod for movement therealong, and a nut threaded onto the rod for limiting movement of the part and hook toward the distal end thereof, eccentric means mounting the hooks on the parts, means for actuating the eccentric means whereby the hooks may be extended and retracted at their limiting position on the rods to disengage the hooks from the top in one position and to engage the hooks with the top in the other position, and a distendable spring mounted on one of the rods between the nut and the part connecting the hook thereon such that the eccentric means for effecting retraction of the hooks simultaneously completely compresses said spring, whereby the clamping means rigidly attaches the carrier to the vehicle top.

2. A car top carrier according to claim 1, wherein the supports are truncated A-frames comprising a substantially flat top part for clamping engagement with the underside of the bar and diverging legs at the extremities of which are mounted pads.

3. A car top carrier according to claim 2, wherein there are spaced parallel upstanding ribs at the junctions of the top part with the upper ends of the legs, the distance between which corresponds substantially to the width of the lower side of the bar.

4. A car top carrier according to claim 2, wherein the pads have lower surfaces which slope downwardly and outwardly toward the outer ends of the bar.

5. A car top carrier according to claim 1, comprising a clamp collar mounted on the bar at each end for receiving one end of a binding strap.

6. A car top carrier according to claim 1, comprising a U-shaped collar having a bridge piece corresponding in width to the width of the bar, spaced parallel legs of a length to extend downwardly beyond the lower side of the bar, and bolts mounted to the underside of the bar through holes in the legs for clamping the legs against the sides of the bar.

7. A car top carrier according to claim 6, wherein the bridge piece is V-shaped in transverse section.

8. A car top carrier according to claim 1, wherein the carrier bar is a hollow extruded structure embodying at the underside a part of reduced transverse section containing a bottom opening for slidingly accommodating the supports and linkages and at its upper side a part of reduced transverse cross-section having a top opening for receiving a capping strip of flexible non-metallic material.

9. A car top carrier comprising an elongate rigid bar, retractable hooks, linkages connecting the hooks to the ends of the bar for adjustment when extended to a width corresponding to the width of the top of the car, one of said linkages embodying distended spring means in said extended position of the hooks, means for retracting the hooks into engagement with the edges along the opposite sides of the top and simultaneously to completely compress said spring means, clamp parts slidably mounted at the lower side of the rigid bar near the ends for movement longitudinally of the bar and means connecting the linkage at each end to the part at that end, said linkage being rotatably mounted to the part, and means providing for fixing the linkage at a predetermined position from the end of the bar.

10. A car top carrier according to claim 9, wherein the bar has at its underside spaced parallel flanges slidably supporting said clamp parts for movement along the underside of one bar.

11. A car top carrier according to claim 1, comprising clamp parts slidably mounted at the lower side of the rigid bar near the ends for movement longitudinally of the bar, and means connecting the support and linkage at each end to the part at that end, the support being non-rotatably mounted to the part and the linkage being rotatably mounted to the part at a predetermined fixed distance from the support, the means connecting the support to the part providing for fixing the clamp part, support and linkage at a predetermined position from the end of the bar.

12. A car top carrier according to claim 11, wherein the bar has at its underside spaced parallel flanges slidably supporting said clamp parts for movement along the underside of the bar.

* * * * *